(12) United States Patent
Wang et al.

(10) Patent No.: US 9,678,831 B2
(45) Date of Patent: Jun. 13, 2017

(54) ERROR CORRECTION METHOD AND MEMORY DEVICE CAPABLE OF READING PAGES CONTINUOUSLY

(71) Applicant: Silicon Motion, Inc., Jhubei, Hsinchu County (TW)

(72) Inventors: Tuan-Chieh Wang, Wandan Township, Pingtung County (TW); Chi-Chih Kuan, Nantou (TW); Chun-Yu Chen, New Taipei (TW); Mong-Ling Chiao, Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 157 days.

(21) Appl. No.: 14/202,215

(22) Filed: Mar. 10, 2014

(65) Prior Publication Data
US 2014/0281826 A1  Sep. 18, 2014

(30) Foreign Application Priority Data

Mar. 18, 2013 (TW) ................. 102109427

(51) Int. Cl.
*G06F 11/10* (2006.01)
*G06F 11/00* (2006.01)

(52) U.S. Cl.
CPC ...... *G06F 11/1068* (2013.01); *G06F 11/1008* (2013.01)

(58) Field of Classification Search
None
See application file for complete search history.

(56) References Cited

U.S. PATENT DOCUMENTS

| 6,662,334 | B1 * | 12/2003 | Stenfort | G11B 20/1833 |
| | | | | 714/769 |
| 8,375,275 | B2 | 2/2013 | Chen et al. | |
| 8,413,015 | B2 * | 4/2013 | Cheng | G06F 11/1044 |
| | | | | 714/763 |
| 8,615,700 | B2 * | 12/2013 | Dave | G06F 11/1068 |
| | | | | 714/773 |
| 8,819,332 | B2 * | 8/2014 | Suto | G06F 11/1068 |
| | | | | 711/103 |

(Continued)

FOREIGN PATENT DOCUMENTS

| CN | 101752010 | 6/2010 |
| CN | 101908376 | 12/2010 |

(Continued)

*Primary Examiner* — Justin R Knapp
(74) *Attorney, Agent, or Firm* — McClure, Qualey & Rodack, LLP

(57) ABSTRACT

The present invention discloses an error correction method applied to a memory device, wherein the memory device has a plurality of pages. The error correction method includes: sequentially retrieving data of a plurality of first sectors of a first page of the pages in response to a first read command; performing a first error correction by an error correction module during retrieval the data of the first page; producing a second read command when the data of the first sectors of the first page are all retrieved; and starting to sequentially retrieve data of a plurality of second sectors of a second page of the pages in response to the second read command after the data of the first sectors of the first page are all retrieved.

12 Claims, 4 Drawing Sheets

(56) References Cited

U.S. PATENT DOCUMENTS

| | | | | |
|---|---|---|---|---|
| 8,850,284 | B2* | 9/2014 | Yang | H03M 13/152 |
| | | | | 714/751 |
| 9,218,888 | B2* | 12/2015 | Yamauchi | G11C 16/0483 |
| 9,324,450 | B2* | 4/2016 | Jigour | G11C 29/04 |
| 2004/0243906 | A1* | 12/2004 | Huang | G06F 11/1068 |
| | | | | 714/758 |
| 2006/0050314 | A1* | 3/2006 | Shiga | G11C 16/102 |
| | | | | 358/1.16 |
| 2008/0222491 | A1* | 9/2008 | Lee | G06F 11/1068 |
| | | | | 714/763 |
| 2011/0041039 | A1* | 2/2011 | Harari | G06F 11/1068 |
| | | | | 714/773 |
| 2011/0258514 | A1* | 10/2011 | Lasser | G06F 11/1012 |
| | | | | 714/763 |
| 2012/0159286 | A1* | 6/2012 | Koshiyama | G06F 11/1048 |
| | | | | 714/768 |
| 2012/0213001 | A1 | 8/2012 | Yang | |

FOREIGN PATENT DOCUMENTS

| | | |
|---|---|---|
| CN | 102609224 | 7/2012 |
| TW | 583687 | 4/2004 |

* cited by examiner

ERROR CORRECTION METHOD AND MEMORY DEVICE CAPABLE OF READING PAGES CONTINUOUSLY

CROSS REFERENCE TO RELATED APPLICATIONS

This application claims priority of Taiwan Patent Application No. 102109427, filed on Mar. 18, 2013, the entirety of which is incorporated by reference herein.

BACKGROUND OF THE INVENTION

Field of the Invention

The present invention is related to an error correction method applied to a memory device, and in particular to an error correction method capable of reading pages continuously.

Description of the Related Art

A non-volatile memory is generally used for many applications, for example, in solid-state disks (SSD), memory cards, digital cameras, digital video cameras, multimedia players, mobile phones, computers and other related electronic devices.

However, when the processing data (i.e. firmware) stored in the flash memory is missing or damaged (or due to poor design), the processing unit of the flash memory controller cannot operate normally, such that the user cannot read the content of the flash memory. Thus, there is a need for a flash memory controller which can analyze data in a flash memory and identify the locations of errors, when the processing data stored in the flash memory includes errors.

Generally, the error correction process and page reading process are preformed simultaneously for each page. Namely, devices must finish the reading and the error correction processes of the first page, and read and correct the next page after that. Therefore, the time that the system waits is lengthened, such that data cannot be read efficiently.

BRIEF SUMMARY OF THE INVENTION

A detailed description is given in the following embodiments with reference to the accompanying drawings.

The present invention discloses an error correction method applied to a memory device, wherein the memory device has a plurality of pages. The error correction method includes: sequentially retrieving data of a plurality of first sectors of a first page of the pages in response to a first read command; performing a first error correction by an error correction module while retrieving the data of the first page; producing a second read command when the data of the first sectors of the first page is all retrieved; and starting to sequentially retrieve data of a plurality of second sectors of a second page of the pages in response to the second read command after the data of the first sectors of the first page is all retrieved.

The present invention further discloses an error correction method applied to a memory device, wherein the memory device includes a plurality of pages. The error correction method includes: sequentially retrieving data of a plurality of first sectors of a first page of the pages in response to a first read command; performing a first error correction by an error correction module during retrieval the data of the first page; producing a second read command when the data of the first sectors of the first page is all retrieved and the first error correction is not finished; and sequentially retrieving data of a plurality of second sectors of a second page of the pages in response to the second read command.

The present invention further discloses a memory device including a flash memory, a memory controller and a processing device. The flash memory has a plurality of pages. The memory controller is arranged to sequentially retrieve data of a plurality of first sectors of a first page of the pages in response to a first read command, and start to sequentially retrieve data of a plurality of second sectors of a second page of the pages in response to a second read command after the data of the first sectors of the first page is all retrieved, wherein the memory controller further comprises an error correction module arranged to perform a first error correction on the retrieved data of the first page during retrieval the data of the first page. The processing device is arranged to produce the first read command, and to produce the second read command when the data of the first sectors of the first page is all retrieved.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
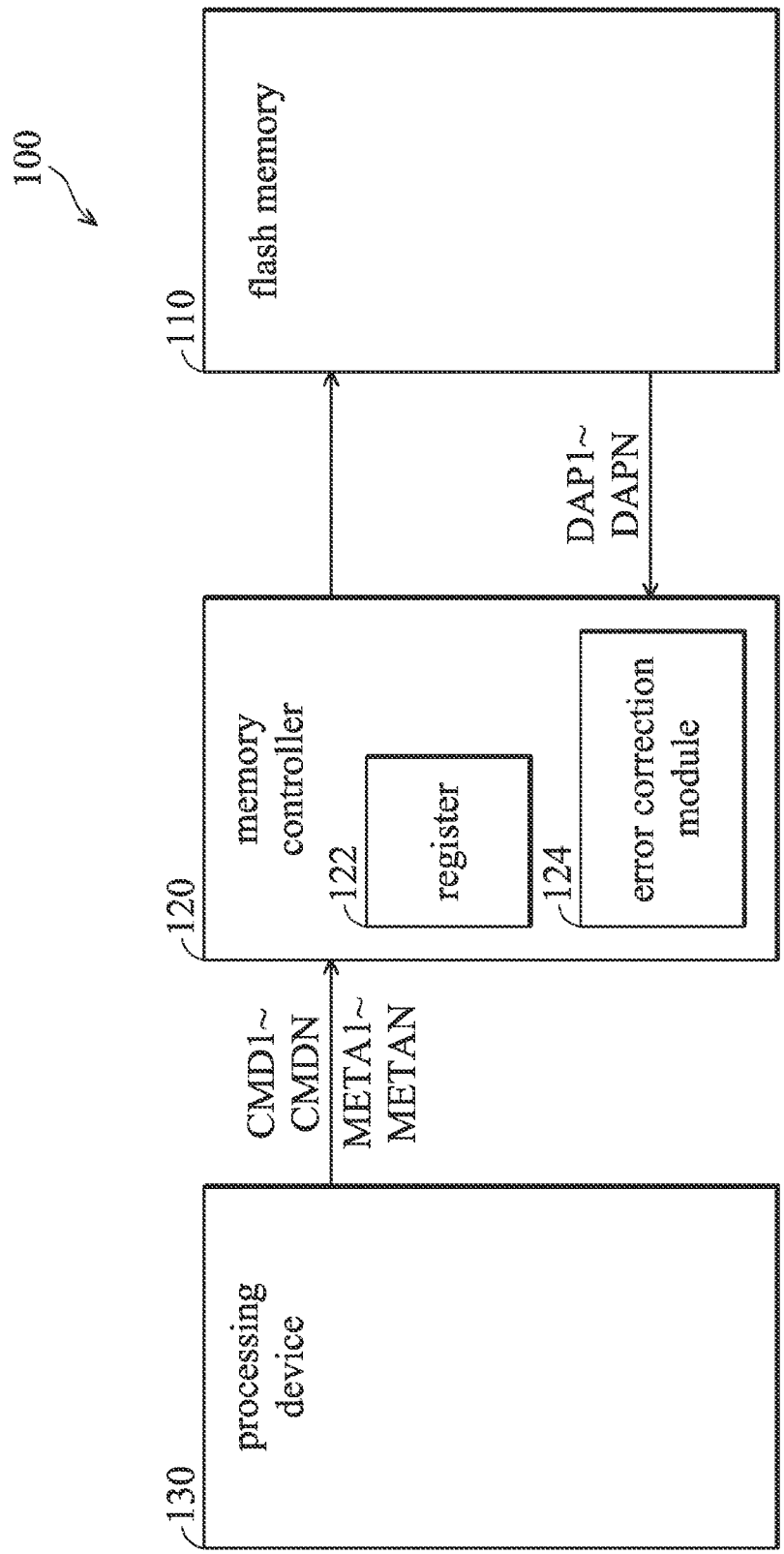
FIG. 1 is a schematic diagram illustrating an embodiment of a memory device of the present invention.

FIG. 1 is a schematic diagram illustrating an embodiment of a memory device of the present invention. The memory device 100 includes a flash memory 110, a memory controller 120 and a processing device 130. The flash memory 110 has a plurality of pages, wherein each of the pages has a plurality of sectors arranged to store data. The memory controller 120 is arranged to sequentially retrieve (read) the data stored in the sectors of the pages DAP1-DAPN according to a plurality of read commands CMD1-CMDN produced by the processing device 130. It should be noted that the sectors of the first page are referred to as "first sectors", the sectors of the second page are referred to as "second sectors", and so on. For example, the memory controller 120 is arranged to sequentially retrieve (read) the data stored in all of the sectors of the first page DAP1 according to a first read command CMD1. Next, after the data of the sectors of the first page is all retrieved, the memory controller 120 starts to sequentially retrieve (read) all of the data of the sectors of the second page DAP2 according to a second read command CMD2, and so on. It should be noted that the memory controller 120 further includes a register 122 and an error correction module 124.

The register 122 is arranged to store the meta data META1-META2 of the read commands CMD1-CMDN. For example, the memory controller 120 stores the first meta
} data META1 included in the first read command CMD1 in the register 122 after the memory controller 120 receives the first read command CMD1 from the processing device 130. The memory controller 120 is further arranged to provide the first meta data META1 to the error correction module 124 while the error correction module 124 is executing the first error correction on the first page. Next, the memory controller 120 stores the second meta data META2 of the second read command CMD2 in the register 122 after the memory controller 120 receives the second read command CMD2 from the processing device 130. The memory controller 120 is further arranged to provide the second meta data META2 to the error correction module 124 while the error correction module 124 is executing the second error correction on the second page, and so on.

The error correction module 124 is arranged to execute error correction on the data of the sectors which has been retrieved by the memory controller 120 while the memory controller 120 is retrieving the pages corresponding to the received read command. For example, the error correction module 124 executes the first error correction on the data of the first page, which has been retrieved by the memory controller 120, during the period that the memory controller 120 is reading the first page. It should be noted that the error correction module 124 is further arranged to continually execute the first error correction on the data DAP1 when the first error correction is not finished during the period that the memory controller 120 is reading the second page, and start to execute the second error correction on the data DAP2 when the first error correction is finished during the period that the memory controller 120 is reading the second page, and so on. In another embodiment of the present invention, the error correction module 124 is further arranged to retrieve the first meta data META1 during the first error correction, and retrieve the second meta data META2 during the second error correction, and so on. Therefore, when the error correction module 124 determines that an error has occurred, the error correction module 124 is arranged to determine whether the error belongs to the first sectors or the second sectors according to the retrieved first meta data or the retrieved second meta data.

Namely, the error correction module 124 is arranged to sequentially execute error corrections on the pages retrieved by the memory controller 120, and the memory controller 120 is arranged to sequentially and continuously retrieve the pages. Even if the error correction module 124 has not finished the error correction of the last page, the memory controller 120 will still retrieve the data of the next page. Therefore, the memory controller 120 of the present invention is arranged to sequentially and continuously retrieve the pages of the flash memory 110 without effecting an error correction. Namely, in some embodiments, the error correction module 124 executes the error correction of the last page when the memory controller 120 is already reading the data of the next page, but it is not limited thereto.

The processing device 130 is arranged to produce the read commands CMD1-CMDN. For example, the processing device 130 produces the first read command CMD1, and transmits the first read command CMD1 to the memory controller 120, such that the memory controller 120 retrieves the data of the sectors of the first page DAP1 sequentially according to the first read command CMD1. Next, the processing device 130 produces the second read command CMD2 and transmits the second read command CMD2 to the memory controller 120 after the memory controller 120 has retrieved all of the data of the sectors of the first page DAP1, such that the memory controller 120 can retrieve the data of the sectors of the second page DAP2 sequentially in response to the second read command CMD2, and so on. It should be noted that each of the read commands CMD1-CMDN includes a corresponding meta data META1-METAN, and each of the meta data META1-METAN includes a logic address, a physical address and/or DMA (Direct Memory Access, DMA) information of the corresponding page, but it is not limited thereto. It should be noted that, in some embodiments, the processing device 130 is arranged to produce the second read command CMD2 after all of the data of the sectors of the first page DAP1 has been retrieved and while the first error correction is not finished.

Figure 2:
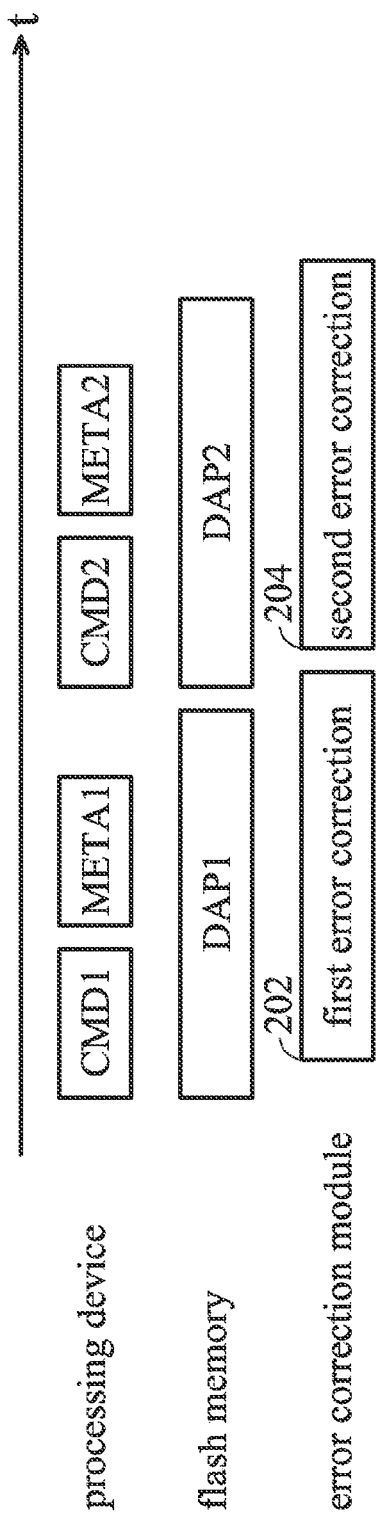
FIG. 2 is a schematic diagram of signal streams of the memory device.

FIG. 2 is a schematic diagram of signal streams of the memory device. When the processing device 130 produces the first read command CMD1 including the first meta data META1, the memory controller 120 starts to retrieve the data of the sectors of the first page sequentially. Next, the error correction module 124 executes the first error correction 202 on the data of the sectors of the first page DAP1 sequentially. The processing device 130 produces the second read command CMD2 including the second meta data META2 after the memory controller 120 finishes retrieving the data of the sectors of the first page DAP1 no matter whether the data of the sectors of first page is all retrieved, and the memory controller 120 starts to retrieve the data of the sectors of second page DAP2 according to the second read command CMD2. If the first error correction 202 is not finished, the period of retrieving the data of the sectors of the second page DAP2 by the memory controller 120 will overlap with the period of the first error correction 202 until the first error correction 202 is finished. When the first error correction 202 is finished, the error correction module 124 starts to execute the second error correction 204 on the data of the sectors of the second page DAP2, sequentially, and so on. It should be noted that, in other embodiments, the period of retrieving the data of the sectors of the second page DAP2 by the memory controller 120 will not overlap with the period of first error correction 202, but it is not limited thereto.

For example, each of the pages of the flash memory 110 has 8 sectors, and each of the sectors has 1K bits, but it is not limited thereto. The memory controller 120 starts to sequentially retrieve the 8 sectors of the first page of the flash memory 110 in response to the first read command CMD1, and the error correction module 124 starts to execute the error correction on the retrieved data of the sectors of the first page DAP1. When the memory controller 120 has retrieved the 8 sectors of the first page, the processing device 130 produces the second read command CMD2 and provides the second read command CMD2 to the memory controller 120. Therefore, the memory controller 120 starts to retrieve the 8 sectors of the second page right after finishing retrieve all of the eighth sectors of the first page in response to the second read command CMD2. In one embodiment, when the memory controller 120 has retrieved the first to eighth sectors of the first page, the error correction module 124 only finishes the error correction of the first to sixth sectors of the first page. The memory controller 120 is arranged to retrieve the sectors of the second page when the memory controller 120 has retrieved all of the 8 sectors and the error correction module 124 has not finished the first error correction of the first page. In this embodiment, the error correction module 124 continuous to execute the remaining error corrections of the seventh and the eighth sectors of the first page until the error correction module 124 finishes the error correction of the eighth sector of the first page. When the error correction module 124 completes the error correction of the eighth sector of the first page, the error correction module 124 starts to execute the error correction on the data of the sectors of the second page DAP2 which has been retrieved by the memory controller 120.

Figure 3A:
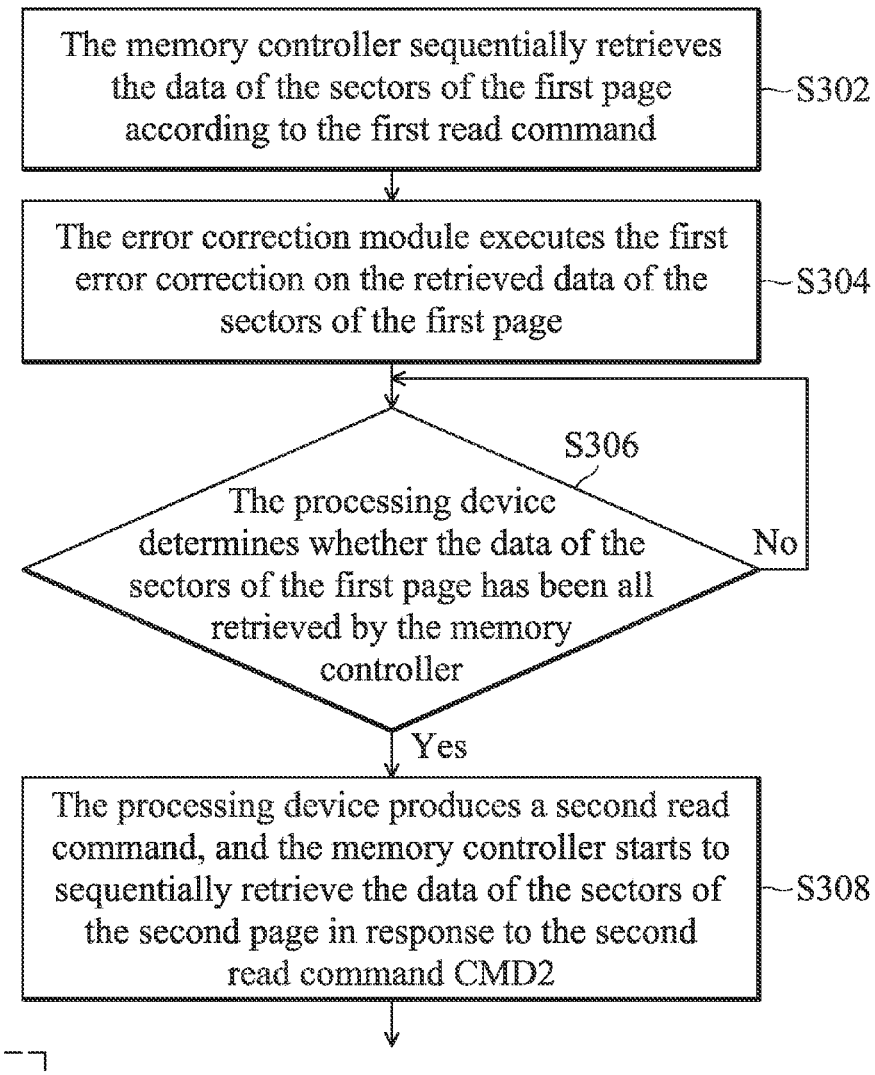
FIGS. 3A and 3B make up a flowchart of an error correction method according to an embodiment of the present invention.
Figure 3B:
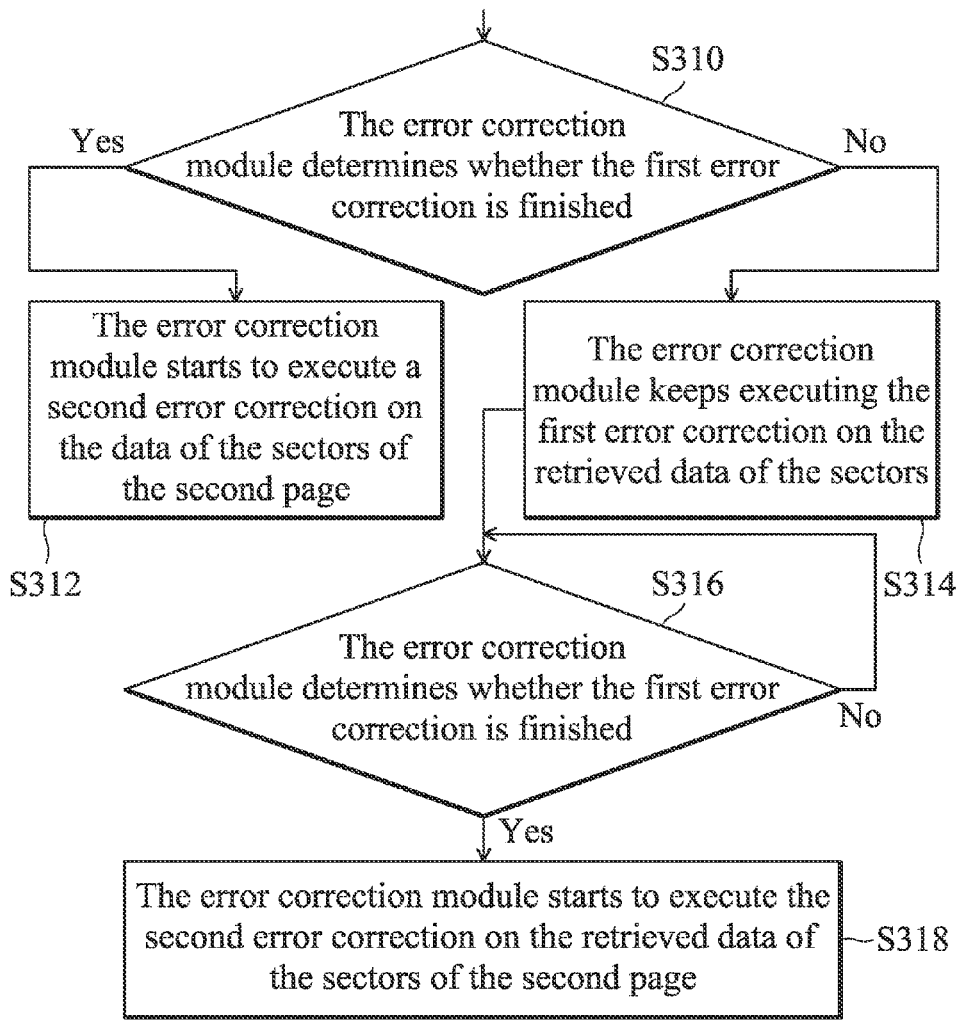

FIG. 3 is a flowchart of an error correction method according to an embodiment of the present invention, wherein the error correction method is applied to the memory device 100 of FIG. 1. The process starts at step S302.

In step S302, the memory controller 120 sequentially retrieves the data of the sectors of the first page DAP1 according to the first read command CMD1. It should be noted that, in some embodiments, the first read command CMD1 further includes a first meta data META1. The memory controller 120 is further arranged to store the first meta data META1 in the register 122.

Next, in step S304, the error correction module 124 executes the first error correction on the data of the sectors of the first page DAP1 which has been retrieved by the memory controller 120 during the period that the memory controller 120 is reading the first page. It should be noted that, in some embodiments, when the error correction module 124 is further arranged to retrieve the first meta data META1 from the register 122 during the first error correction. Furthermore, when the error correction module 124 determines that an error has occurred, the error correction module 124 determines that the error belongs to the first sectors of the first page according to the retrieved first meta data META1.

Next, in step S306, the processing device 130 determines whether all of the data of the sectors of the first page has been retrieved by the memory controller 120. When all of the data of the sectors of the first page has been retrieved by the memory controller 120, the process goes to step S308, otherwise, the processing device 130 continuous to determine whether the data of the sectors of the first page has all been retrieved by the memory controller 120.

In step S308, the processing device 130 produces a second read command CMD2, and the memory controller 120 starts to sequentially retrieve (read) the data of the sectors of the second page DAP2 according to the second read command CMD2. It should be noted that, in some embodiments, the second read command CMD2 further includes a second meta data META2. The memory controller 120 is further arranged to store the second meta data META2 in the register 122.

Next, in step S310, the error correction module 124 determines whether the first error correction is finished. When the first error correction is finished, the process goes to step S312. When the first error correction is not finished, the process goes to step S314.

In step S312, when the first error correction is finished and the memory controller 120 is retrieving the second page, the error correction module 124 starts to execute a second error correction on the data of the sectors of the second page DAP2. It should be noted that, in some embodiment, the error correction module 124 is further arranged to retrieve the second meta data META2 from the register 122 during the period that the error correction module 124 is executing the second error correction. When the error correction module 124 determines that an error is occurred, the error correction module 124 determines that the error belongs to the second sectors of the second page according to the retrieved second meta data META2. The process ends at the step S312, but it is not limited thereto. In other embodi-ments, the processing device 130 continuous to produce the read commands corresponding to the third page, the fourth page, etc., and the following operations of the memory controller 120 and the error correction module 124 are similar to the steps S302-S318.

In step S314, the error correction module 124 continuous to execute the first error correction on the retrieved data of the sectors DAP1 when the first error correction is not finished during the period that the memory controller 120 is retrieving the second page. It should be noted that, in some embodiments, the processing device 130 is arranged to produce the second read command CMD2 when the first error correction is not finished and the memory controller 120 has retrieved all of the data of the sectors of the first page DAP1.

Next, in step S316, the error correction module 124 determines whether the first error correction is finished. When the first error correction is finished, the process goes to step S318, otherwise, the error correction module 124 continuous to determine whether the first error correction is finished.

In step S318, the error correction module 124 starts to execute the second error correction on the retrieved data of the sectors of the second page DAP2 when the first error correction is finished during the period that the memory controller 120 is retrieving the second page. It should be noted that, in some embodiment, when the error correction module 124 executes the second error correction, the error correction module 124 is further arranged to retrieve the second meta data META2 from the register 122. When the error correction module 124 determines that an error is occurred, the error correction module 124 determines that the error belongs to the second sectors of the second page according to the retrieved second meta data META2. The process ends at step S318, but it is not limited thereto. In other embodiments, the processing device 130 continuous to produce the read commands corresponding to the third page, the fourth page, etc. Next, the operation of the memory controller 120 and the error correction module 124 is similar to the steps S302-S318.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An error correction method, applied to a memory device, wherein the memory device has a plurality of pages, and the error correction method comprises:
   sequentially retrieving data of a plurality of first sectors of a first page of the pages in response to a first read command;
   starting to perform a first error correction on the retrieved data of the first sectors by an error correction module during retrieval of the data of the first sectors;
   starting to sequentially retrieve data of a plurality of second sectors of a second page of the pages in response to a second read command at a time that a last sector of the first sectors is retrieved from the first page;
   continually performing the first error correction on the retrieved data of the first sectors during retrieval of the data of the second page; and
   starting to perform a second error correction on the retrieved data of the second sectors by the error correction module after the first error correction is finished during retrieval the data of the second page.

2. The error correction method as claimed in claim 1, wherein the second read command is produced, when the data of the first sectors of the first page is all retrieved and the first error correction is not finished.

3. The error correction method as claimed in claim 1, wherein the first read command further includes a first meta data and the second read command further includes a second meta data.

4. The error correction method as claimed in claim 3, further comprising:
   retrieving the first meta data by the error correction module during the first error correction;
   retrieving the second meta data by the error correction module during the second error correction; and
   determining whether an error belongs to the first sectors or the second sectors according to the retrieved first meta data or the second meta data when the error correction module determines the error has occurred.

5. An error correction method, applied to a memory device, wherein the memory device includes a plurality of pages, the error correction method comprises:
   sequentially retrieving data of a plurality of first sectors of a first page of the pages in response to a first read command;
   starting to perform a first error correction on the retrieved data of the first sectors by an error correction module during retrieval the data of the first sectors;
   starting to sequentially retrieve data of a plurality of second sectors of a second page of the pages when the data of the first sectors of the first page is all retrieved and the first error correction is not finished in response to a second read commands;
   continually performing the first error correction on the retrieved data of the first sectors during retrieval the data of the second page when the first error correction is not finished; and
   starting to perform a second error correction by the error correction module on the retrieved data of the second sectors after the first error correction is finished during retrieval the data of the second page.

6. The error correction method as claimed in claim 5, wherein the step of retrieving data of the second sectors of the second page is performed when the data of the first sectors of the first page is all retrieved.

7. The error correction method as claimed in claim 5, wherein the first read command further includes a first meta data and the second read command further includes a second meta data.

8. The error correction method as claimed in claim 7, further comprising:
   retrieving the first meta data by the error correction module during the first error correction;
   retrieving the second meta data by the error correction module during the second error correction; and
   determining whether an error belongs to the first sectors or the second sectors according to the retrieved first meta data or the second meta data when the error correction module determines the error has occurred.

9. A memory device, comprising:
   a flash memory, having a plurality of pages;
   a memory controller, arranged to sequentially retrieve data of a plurality of first sectors of a first page of the pages in response to a first read command, start to sequentially retrieve data of a plurality of second sectors of a second page of the pages in response to a second read command at a time that a last of the first sectors is retrieved from the first page, continually perform a first error correction on the retrieved data of the first sectors during retrieval the data of the second page when the first error correction is not finished, and start to perform a second error correction on the retrieved data of the second sectors after the first error correction is finished during retrieval the data of the second page, wherein the memory controller further comprises an error correction module arranged to start to perform a first error correction on the retrieved data of the first sectors during retrieval the data of the first sectors; and
   a processing device, arranged to produce the first read command, and produce the second read command when the data of the first sectors of the first page is all retrieved.

10. The memory device as claimed in claim 9, wherein the processing device is arranged to produce the second read command when the data of the first sectors of the first page is all retrieved and the first error correction is not finished.

11. The memory device as claimed in claim 9, wherein the memory controller further comprises a register arranged to store a first meta data of the first read command and a second meta data of the second read command.

12. The memory device as claimed in claim 11, wherein the error correction module is further arranged to retrieve the first meta data during the first error correction, retrieve the second meta data during the second error correction, wherein the error correction module is further arranged to determine whether an error belongs to the first sectors or the second sectors according to the retrieved first meta data or the second meta data when the error correction module determines the error is occurred.

* * * * *